US008964329B2

(12) United States Patent
Taki et al.

(10) Patent No.: US 8,964,329 B2
(45) Date of Patent: Feb. 24, 2015

(54) SPINDLE MOTOR WITH A LEAD WIRE GUIDE MEMBER FOR USE IN DISK DRIVE APPARATUS

(71) Applicant: Nidec Corporation, Kyoto (JP)

(72) Inventors: Masanobu Taki, Kyoto (JP); Hiroshi Kobayashi, Kyoto (JP); Tomohiro Yoneda, Kyoto (JP); Makoto Yamashita, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/265,508

(22) Filed: Apr. 30, 2014

(65) Prior Publication Data

US 2014/0362470 A1 Dec. 11, 2014

(30) Foreign Application Priority Data

Jun. 7, 2013 (JP) ................. 2013-120432

(51) Int. Cl.
| | |
|---|---|
| *G11B 17/02* | (2006.01) |
| *H02K 5/22* | (2006.01) |
| *G11B 33/12* | (2006.01) |
| *H02K 3/28* | (2006.01) |

(Continued)

(52) U.S. Cl.
CPC .............. *H02K 3/28* (2013.01); *G11B 19/2009* (2013.01); *H02K 3/38* (2013.01); *H02K 2203/03* (2013.01); *H02K 2203/06* (2013.01); *H02K 2211/03* (2013.01)
USPC .......... 360/98.07; 360/99.08; 310/71

(58) Field of Classification Search
USPC ............... 360/98.07, 99.08; 310/71
See application file for complete search history.

(56) References Cited

U.S. PATENT DOCUMENTS

| 5,572,381 A | 11/1996 | Stewart |
|---|---|---|
| 6,118,198 A | 9/2000 | Hollenbeck et al. |

(Continued)

FOREIGN PATENT DOCUMENTS

| JP | 07-75275 A | 3/1995 |
|---|---|---|
| JP | 07-107693 A | 4/1995 |

(Continued)

OTHER PUBLICATIONS

Taki et al.; "Spindle Motor for Use in Disk Drive Apparatus and Disk Drive Apparatus, Disk Drive Apparatus, and Method of Manufacturing Spindle Motor"; U.S. Appl. No. 14/250,739, filed Apr. 11, 2014.

(Continued)

*Primary Examiner* — Jefferson Evans
(74) *Attorney, Agent, or Firm* — Keating & Bennett, LLP (57) ABSTRACT

A lead wire guide member is made of an electrically insulating material, and arranged to extend along a lower surface of a base portion. A movement restricting portion is arranged in the lower surface of the base portion. Lead wires are arranged to pass through base through holes to reach the lower surface, and extend along the lower surface to be connected to the circuit board. A spindle motor further includes a sealant arranged between an entire circumferential extent of each base through hole and an entire circumferential extent of the corresponding lead wire. The lead wire guide member includes an inner edge and an outer edge. The inner edge is arranged opposite to the lead wires. The outer edge is arranged to at least face radially outward. The movement restricting portion is in contact with the outer edge of the lead wire guide member.

15 Claims, 10 Drawing Sheets

(51) Int. Cl.
*G11B 19/20* (2006.01)
*H02K 3/38* (2006.01)

(56) References Cited

U.S. PATENT DOCUMENTS

| | | | |
|---|---|---|---|
| 6,652,324 B2 | 11/2003 | Maiers et al. | |
| 6,771,460 B2 | 8/2004 | Nii et al. | |
| 7,012,191 B1 | 3/2006 | Watanabe et al. | |
| 7,105,963 B2 | 9/2006 | Ito et al. | |
| 7,144,275 B2 | 12/2006 | Iida | |
| 7,254,882 B2 | 8/2007 | Ito et al. | |
| 7,684,146 B1 | 3/2010 | Andrikowich et al. | |
| 7,757,378 B1 | 7/2010 | Mann et al. | |
| 8,120,217 B2 | 2/2012 | Yawata et al. | |
| 8,120,872 B2 | 2/2012 | Sekii et al. | |
| 8,164,851 B2 * | 4/2012 | Yoneda et al. | 360/99.08 |
| 8,299,668 B2 | 10/2012 | Yawata et al. | |
| 8,304,945 B2 | 11/2012 | Yawata et al. | |
| 8,324,771 B2 | 12/2012 | Yawata et al. | |
| 8,400,729 B1 | 3/2013 | Watanabe | |
| 8,675,305 B2 | 3/2014 | Watanabe et al. | |
| 8,687,316 B2 | 4/2014 | Watanabe et al. | |
| 8,755,145 B2 * | 6/2014 | Matsumoto et al. | 360/99.08 |
| 2005/0206255 A1 | 9/2005 | Yoshino et al. | |
| 2006/0023339 A1 | 2/2006 | Fukuyama et al. | |
| 2007/0278880 A1 * | 12/2007 | Wada et al. | 310/90 |
| 2009/0316299 A1 | 12/2009 | Tashiro et al. | |
| 2011/0122530 A1 * | 5/2011 | Sekii et al. | 360/99.08 |
| 2011/0249362 A1 | 10/2011 | Saichi et al. | |
| 2012/0092792 A1 | 4/2012 | Sugi et al. | |
| 2012/0113546 A1 * | 5/2012 | Sugi et al. | 360/97.19 |
| 2012/0162818 A1 | 6/2012 | Sugi et al. | |
| 2012/0182645 A1 * | 7/2012 | Kurokawa et al. | 360/99.08 |
| 2012/0200957 A1 * | 8/2012 | Yawata | 360/99.08 |
| 2013/0031773 A1 | 2/2013 | Matsuyama et al. | |
| 2013/0038964 A1 * | 2/2013 | Garbarino et al. | 360/99.08 |
| 2013/0050874 A1 | 2/2013 | Yawata et al. | |
| 2013/0148241 A1 * | 6/2013 | Watanabe et al. | 360/99.08 |

FOREIGN PATENT DOCUMENTS

| | | |
|---|---|---|
| JP | 07-222386 A | 8/1995 |
| JP | 07-334967 A | 12/1995 |
| JP | 11-218128 A | 8/1999 |
| JP | 2000-209804 A | 7/2000 |
| JP | 2001-067775 A | 3/2001 |
| JP | 2005-057892 A | 3/2005 |
| JP | 2006-040423 A | 2/2006 |
| JP | 2009-110611 A | 5/2009 |
| JP | 2012-74114 | 4/2012 |

OTHER PUBLICATIONS

Matsuyama et al.; "Spindle Motor, Disk Drive Apparatus, and Method of Manufacturing Spindle Motor"; U.S. Appl. No. 13/424,632, filed Mar. 20, 2012.

* cited by examiner

SPINDLE MOTOR WITH A LEAD WIRE GUIDE MEMBER FOR USE IN DISK DRIVE APPARATUS

BACKGROUND OF THE INVENTION

1. Field of the Invention

The present invention relates to a spindle motor, and more specifically to a spindle motor preferably for use in a disk drive apparatus, and a disk drive apparatus.

2. Description of the Related Art

Disk drive apparatuses, such as hard disk drives, typically have spindle motors (hereinafter referred to simply as "motors") installed therein. In a disk drive apparatus disclosed in JP-A 06-162733, an insulating bushing is fitted in a through hole of a bracket, so that electrical insulation between a coil lead wire and the bracket is ensured. In addition, a thermosetting sealing agent is filled into the through hole, so that the through hole is closed and sealed and at the same time both the insulating bushing and the coil lead wire are fixed. The same is true of an apparatus described in JP-A 2012-124999.

In a disk drive disclosed in JP-A 2001-189073, a main frame also serves as a motor frame. A projecting frame and engagement pins of a guide member are inserted into an opening portion and through holes, respectively, defined in the motor frame, so that the guide member is fitted to the motor frame. Lead wires of a motor are drawn out through the opening portion. The guide member prevents each lead wire from making contact with the main frame.

In a brushless motor described in JP-A 2010-218612, an insulating film is arranged to extend so as to cover an opening of a base plate. The insulating film includes an opening arranged to be in communication with the opening of the base plate. The opening of the insulating film does not cover an edge of the opening of the base plate at a lower surface of the base plate. A wire at one end of a coil is thereby positioned so as not to contact a wall of the opening of the base plate. In addition, a liquid resin is filled into the opening of the base plate, and the liquid resin is cured after the filling.

In recent years, there has been a demand for an improvement in airtightness of disk drive apparatuses. In the case of the disk drive apparatus described in JP-A 06-162733, the bushing is inserted in a through hole of a base portion, and a gap may exist between the bushing and a side surface of the through hole. It is difficult to close such a gap.

SUMMARY OF THE INVENTION

A preferred embodiment of the present invention includes a structure in which a lead wire guide member configured to guide lead wires is arranged on a lower surface of a base portion to prevent each lead wire from making contact with a corresponding base through hole. This makes it possible to arrange a sealant between an entire circumferential extent of each lead wire and an entire circumferential extent of the corresponding base through hole. In addition, a preferred embodiment of the present invention enables the lead wire guide member to be precisely positioned with respect to each base through hole. Furthermore, a preferred embodiment of the present invention makes it possible to appropriately fill the sealant into each base through hole even in the case where the lead wire guide member as described above is provided and the lead wire guide member is arranged to cover a portion of the base through hole.

A spindle motor for use in a disk drive apparatus according to a preferred embodiment of the present invention includes a rotating portion, a stationary portion, and a bearing mechanism. The rotating portion includes a rotor magnet, and is arranged to rotate about a central axis extending in a vertical direction. The bearing mechanism is arranged to support the rotating portion such that the rotating portion is rotatable with respect to the stationary portion. The stationary portion includes a base portion, a stator, a plurality of lead wires, a circuit board, a lead wire guide member, and a movement restricting portion. The base portion is in a shape of a plate, extending in directions perpendicular or substantially perpendicular to an axial direction, and includes a plurality of base through holes passing therethrough in the axial direction. The stator includes a stator core and a plurality of coils. The stator core is arranged on an upper side of the base portion. The coils are arranged on the stator core. The plurality of lead wires are arranged to extend from the plurality of coils. The circuit board is arranged on a lower surface of the base portion. The lead wire guide member is made of an electrically insulating material, is plate-shaped, and is arranged to extend along the lower surface of the base portion. The movement restricting portion is arranged in the lower surface of the base portion, and is an edge extending in the axial direction and facing radially inward. The plurality of lead wires are arranged to pass through the plurality of base through holes to reach the lower surface of the base portion, and extend along the lower surface of the base portion to be connected to the circuit board. The stationary portion further includes a sealant arranged between an entire circumferential extent of each base through hole and an entire circumferential extent of the lead wire arranged to pass through the base through hole. The lead wire guide member includes an inner edge and an outer edge. The inner edge is arranged opposite to the plurality of lead wires. The outer edge is arranged to face at least radially outward. The movement restricting portion is arranged to be in contact with the outer edge of the lead wire guide member.

A spindle motor of a disk drive apparatus according to another preferred embodiment of the present invention includes a rotating portion, a stationary portion, and a bearing mechanism. The rotating portion includes a rotor magnet, and is arranged to rotate about a central axis extending in a vertical direction. The bearing mechanism is arranged to support the rotating portion such that the rotating portion is rotatable with respect to the stationary portion. The stationary portion includes a base portion, a stator, a plurality of lead wires, a circuit board, and a lead wire guide member. The base portion is in a shape of a plate, extending in directions perpendicular or substantially perpendicular to an axial direction, and includes a plurality of base through holes passing therethrough in the axial direction. The stator includes a stator core and a plurality of coils. The stator core is arranged on an upper side of the base portion. The coils are arranged on the stator core. The plurality of lead wires are arranged to extend from the plurality of coils. The circuit board is arranged on a lower surface of the base portion. The lead wire guide member is made of an electrically insulating material, is plate-shaped, and is arranged to extend along the lower surface of the base portion. The plurality of lead wires are arranged to pass through the plurality of base through holes to reach the lower surface of the base portion, and extend along the lower surface of the base portion to be connected to the circuit board. The stationary portion further includes a sealant arranged between an entire circumferential extent of each base through hole and an entire circumferential extent of the lead wire arranged to pass through the base through hole. The lower surface of the base portion includes an auxiliary recessed portion or portions joined to each of the base through holes. The lead wire guide member is arranged to cover at least a portion of each base through hole. Each of the auxiliary recessed portion or portions is arranged to extend up to a position radially outside the lead wire guide member.

A spindle motor of a disk drive apparatus according to yet another preferred embodiment of the present invention includes a rotating portion, a stationary portion, and a bearing mechanism. The rotating portion includes a rotor magnet, and is arranged to rotate about a central axis extending in a vertical direction. The bearing mechanism is arranged to support the rotating portion such that the rotating portion is rotatable with respect to the stationary portion. The stationary portion includes a base portion, a stator, a plurality of lead wires, a circuit board, and a lead wire guide member. The base portion is in a shape of a plate, extending in directions perpendicular or substantially perpendicular to an axial direction, and includes a plurality of base through holes passing therethrough in the axial direction. The stator includes a stator core and a plurality of coils. The stator core is arranged on an upper side of the base portion. The coils are arranged on the stator core. The plurality of lead wires are arranged to extend from the plurality of coils. The circuit board is arranged on a lower surface of the base portion. The lead wire guide member is made of an electrically insulating material, is plate-shaped, and is arranged to extend along the lower surface of the base portion. The plurality of lead wires are arranged to pass through the plurality of base through holes to reach the lower surface of the base portion, and extend along the lower surface of the base portion to be connected to the circuit board. The stationary portion further includes a sealant arranged between an entire circumferential extent of each base through hole and an entire circumferential extent of the lead wire arranged to pass through the base through hole. The lower surface of the base portion includes an auxiliary recessed portion or portions joined to each of the base through holes. The lead wire guide member is arranged to cover at least a portion of each base through hole. The lead wire guide member includes an opening portion arranged to be open under one of the auxiliary recessed portion or portions.

In accordance with the spindle motor preferably for use in the disk drive apparatus according to a preferred embodiment of the present invention, movement of the lead wire guide member is restricted by the movement restricting portion, such that the lead wire guide member is precisely positioned with respect to each base through hole. In accordance with the spindle motor of the disk drive apparatus according to another preferred embodiment of the present invention, provision of the auxiliary recessed portion(s) used for air escape makes it possible to fill the sealant into each base through hole.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
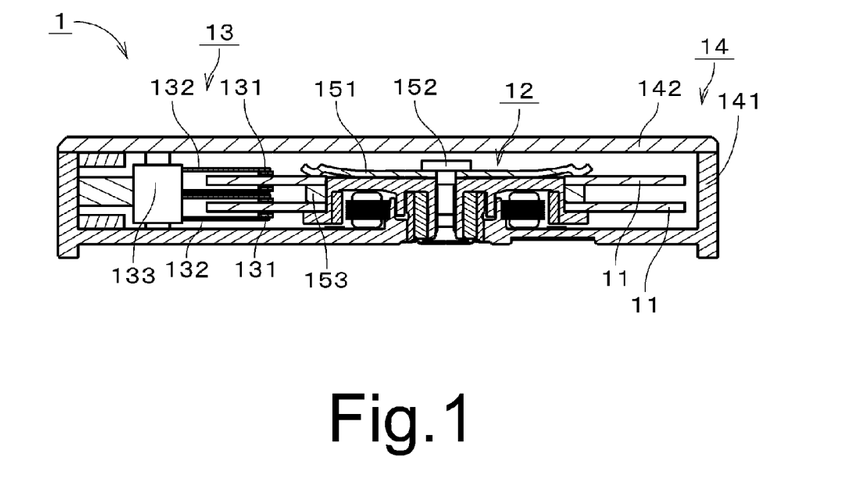
FIG. 1 is a vertical cross-sectional view of a disk drive apparatus according to a first preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel or substantially parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

First Preferred Embodiment

FIG. 1 is a vertical cross-sectional view of a disk drive apparatus 1 including a spindle motor (hereinafter referred to simply as a "motor") 12 according to an exemplary first preferred embodiment of the present invention. The disk drive apparatus 1 is, for example, a hard disk drive. The disk drive apparatus 1 preferably includes, for example, two disks 11, the motor 12, an access portion 13, a housing 14, and a clamper 151. The motor 12 is arranged to rotate the disks 11, on which information is recorded. The access portion 13 is arranged to perform at least one of reading and writing of information from or to the two disks 11.

The housing 14 preferably includes a first housing member 141 and a plate-shaped second housing member 142. The disks 11, the motor 12, the access portion 13, and the clamper 151 are accommodated in the first housing member 141. The second housing member 142 is fitted to the first housing member 141 to define the housing 14. An interior space of the disk drive apparatus 1 is preferably a clean space with no or only an extremely small amount of dirt or dust. The interior space of the disk drive apparatus 1 is preferably filled with air, for example. Note that the interior space of the disk drive apparatus 1 may alternatively be filled with a helium gas, a hydrogen gas, or a mixture of either or both of these gases and air, for example.

The two disks 11 are arranged above and below a spacer 153, and are clamped to the motor 12 by the clamper 151. The access portion 13 includes heads 131, arms 132, and a head actuator mechanism 133. Each of the heads 131 is arranged in close proximity to one of the disks 11 to magnetically perform at least one of reading and writing of information from or to the disk 11. Each of the arms 132 is arranged to support an associated one of the heads 131. The head actuator mechanism 133 is arranged to actuate each of the arms 132 to move an associated one of the heads 131 relative to an associated one of the disks 11. The above mechanism enables the head 131 to access a desired location on the rotating disk 11 with the head 131 being arranged in close proximity to the disk 11.

Figure 2:
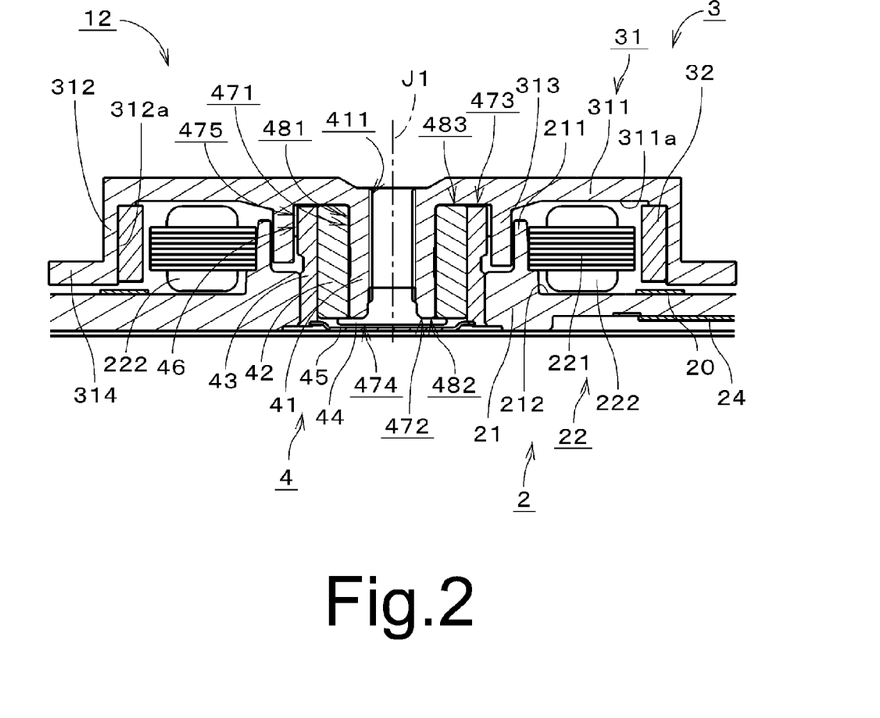
FIG. 2 is a vertical cross-sectional view of a motor according to the first preferred embodiment of the present invention.

FIG. 2 is a vertical cross-sectional view of the motor 12. The motor 12 is preferably an outer-rotor motor, and includes a stationary portion 2, which is a stationary assembly, a rotating portion 3, which is a rotating assembly, and a bearing mechanism 4 arranged to support the rotating portion 3 such that the rotating portion 3 is rotatable with respect to the stationary portion 2. The stationary portion 2 includes a base plate 21, which is a base portion, a stator 22, a magnetic member 20, and a circuit board 24. The base plate 21 preferably is in the shape of a plate, extending in directions perpendicular or substantially perpendicular to an axial direction, and is a portion of the first housing member 141 illustrated in FIG. 1. The base plate 21 is preferably defined by, for example, subjecting a metallic member molded by casting to a cutting process. The stator 22 is arranged above the base plate 21, and includes a stator core 221 and a plurality of coils 222. A radially inner portion of the stator core 221 is fixed to a circumference of a cylindrical holder 211 of the base plate 21. The magnetic member 20 is annular, being centered on a central axis J1 extending in the vertical direction, and is preferably fixed to an upper surface 212 of the base plate 21 through, for example, an adhesive. The circuit board 24 is preferably fixed to a lower surface of the base plate 21. As described below, in the stationary portion 2, conducting wires defining the coils 222 are inserted into through holes of the base plate 21. End portions of the conducting wires are joined to the circuit board 24.

The rotating portion 3 preferably includes a rotor hub 31 and a rotor magnet 32. The rotor hub 31 preferably is in or substantially in the shape of a covered cylinder. The rotor hub 31 preferably includes a cover portion 311, a side wall portion 312, a hub tubular portion 313, and a disk mount portion 314. The cover portion 311 is arranged above the stator 22. The hub tubular portion 313 is cylindrical, being centered on the central axis J1, and is arranged to extend downward from a lower surface 311a of the cover portion 311 radially outside the bearing mechanism 4. The side wall portion 312 is arranged to extend downward from an outer edge of the cover portion 311. The disk mount portion 314 is arranged to extend radially outward from the side wall portion 312. The disks 11 illustrated in FIG. 1 are mounted on the disk mount portion 314. The rotor magnet 32 is preferably fixed to an inner circumferential surface 312a of the side wall portion 312, and is arranged radially outside the stator 22. The magnetic member 20 is located below the rotor magnet 32. A magnetic attraction force is produced between the rotor magnet 32 and the magnetic member 20. While the motor 12 is running, a torque is produced between the stator 22 and the rotor magnet 32, such that the rotating portion 3 is caused to rotate about the central axis J1.

The bearing mechanism 4 preferably includes a shaft portion 41, a sleeve 42, a sleeve housing 43, a thrust plate 44, a cap portion 45, and a lubricating oil 46. The shaft portion 41 is arranged to extend axially downward from a radially inner portion of the cover portion 311. The shaft portion 41 and the rotor hub 31 preferably are defined by a single continuous member. A female screw portion 411 extending through the length of the shaft portion 41 is preferably defined in an interior of the shaft portion 41. At a center of the cover portion 311, a male screw 152 illustrated in FIG. 1 is screwed into the female screw portion 411. The clamper 151 is thus fixed to the motor 12 to clamp the disks 11 to the rotor hub 31.

The shaft portion 41 is inserted inside the sleeve 42. The sleeve housing 43 is arranged inside the hub tubular portion 313. The sleeve 42 is fixed to an inner circumferential surface of the sleeve housing 43. The thrust plate 44 is fixed to a lower portion of the shaft portion 41 as a result of screwing of a male screw portion at a center thereof into the female screw portion 411. The cap portion 45 is fixed to a lower end of the sleeve housing 43 to close a lower opening of the sleeve housing 43.

In the motor 12, the lubricating oil 46 is arranged continuously in a radial gap 471 defined between an inner circumferential surface of the sleeve 42 and an outer circumferential surface of the shaft portion 41, a first thrust gap 472 defined between a lower surface of the sleeve 42 and an upper surface of the thrust plate 44, and a second thrust gap 473 defined between the lower surface 311a of the cover portion 311 and a combination of an upper surface of the sleeve 42 and an upper surface of the sleeve housing 43. In addition, the lubricating oil 46 is also preferably arranged continuously in a gap 474 defined between a lower surface of the thrust plate 44 and an upper surface of the cap portion 45, and a seal gap 475 defined between an inner circumferential surface of the hub tubular portion 313 and an upper portion of an outer circumferential surface of the sleeve housing 43.

Radial dynamic pressure groove arrays are defined in an upper portion and a lower portion of the inner circumferential surface of the sleeve 42. In addition, thrust dynamic pressure groove arrays are defined in the upper surface and the lower surface of the sleeve 42. In the radial gap 471, a radial dynamic pressure bearing portion 481 is defined by the radial dynamic pressure groove arrays. In the first and second thrust gaps 472 and 473, a first thrust dynamic pressure bearing portion 482 and a second thrust dynamic pressure bearing portion 483, respectively, are defined by the thrust dynamic pressure groove arrays. While the motor 12 is running, the shaft portion and the thrust plate 44 are supported, without being in contact with any of the sleeve 42, the sleeve housing 43, and the cap portion 45, by the radial dynamic pressure bearing portion 481 and the first and second thrust dynamic pressure bearing portions 482 and 483, that is, by the bearing mechanism 4. The rotor hub 31 and the rotor magnet 32 are thus supported such that the rotor hub 31 and the rotor magnet 32 are rotatable with respect to the base plate 21 and the stator 22.

The coils 222, each of which is arranged on the stator core 221, are preferably defined by three coil groups. The three coil groups are used for U, V, and W phases, respectively. Each coil group is provided by a collection of three coils 222 defined by a single conducting wire. One end portion of the conducting wire of each coil group is drawn out of the coil group as a lead wire. Opposite end portions of the three conducting wires of the three coil groups are joined together and drawn out as a single lead wire. Thus, four lead wires are preferably drawn out of the stator 22. Note that five or six lead wires may alternatively be drawn out of the stator 22 if so desired.

Figure 3:
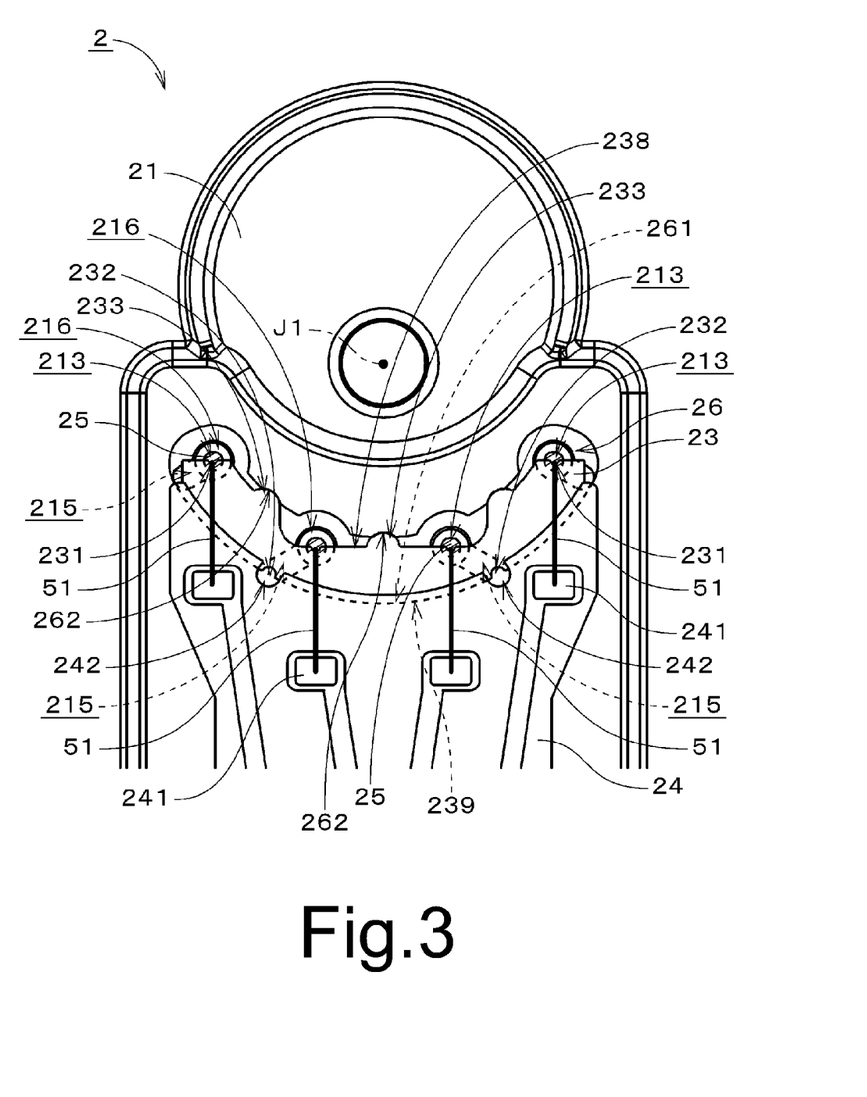
FIG. 3 is a bottom view of a stationary portion according to the first preferred embodiment of the present invention.
Figure 4:
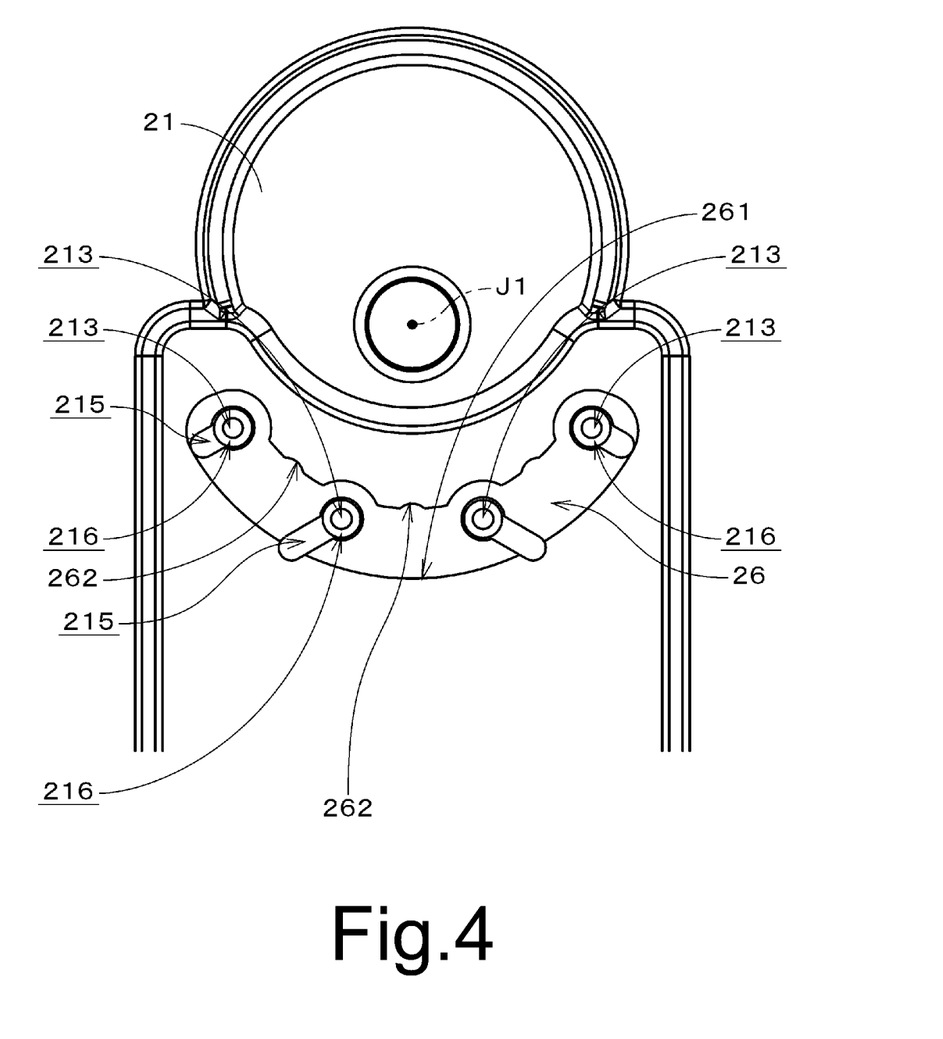
FIG. 4 is a bottom view of a base plate according to the first preferred embodiment of the present invention.
Figure 5:
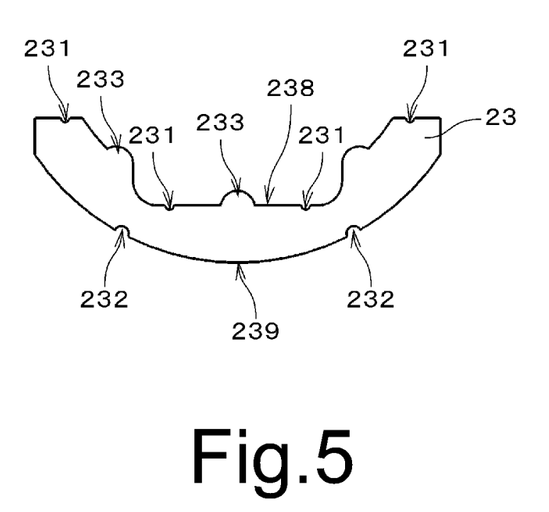
FIG. 5 is a bottom view of a lead wire guide member according to the first preferred embodiment of the present invention.

FIG. 3 is a bottom view of the stationary portion 2. FIG. 4 is a bottom view of the base plate 21. The base plate 21 preferably includes a plurality of base through holes 213 passing therethrough in the axial direction. Here, four base through holes 213 are preferably provided. A comprehensive recessed portion 26 is arranged in the lower surface of the base plate 21. The comprehensive recessed portion 26 is a recessed portion including a region in the shape of a circular or substantially circular arc and including the plurality of base through holes 213 when viewed along the axial direction. An opening of each base through hole 213 is located in the comprehensive recessed portion 26. A lead wire guide member 23 illustrated in FIG. 5 is fitted in the comprehensive recessed portion 26. The lead wire guide member 23 is in the shape of a plate, and is arranged to extend along the lower surface of the base plate 21. The lead wire guide member 23 is made of an insulating material. Further, as illustrated in FIG. 3, the circuit board 24, which is preferably a flexible circuit board, is fixed to the lower surface of the base plate 21. The circuit board 24 is arranged to partially overlap with the lead wire guide member 23. A plurality of electrodes 241 are arranged on the circuit board 24.

A plurality of lead wires 51 extending from the coils 222 on an upper side of the base plate 21 are arranged to pass through the base through holes 213 to reach the lower surface of the base plate 21. An inner edge 238 of the lead wire guide member 23 is arranged opposite to the lead wires 51 on lower sides of the base through holes 213. The term "edge" as used herein comprehends both an end surface and an edge of the end surface which extends perpendicularly or substantially perpendicularly to the axial direction. Accordingly, the inner edge 238 includes both an end surface of the lead wire guide member 23 which faces the central axis J1 and an edge of this end surface which extends perpendicularly or substantially perpendicularly to the axial direction.

The inner edge 238 of the lead wire guide member 23 preferably includes a plurality of cut portions 231 defined therein. Each of the cut portions 231 is arranged to be in contact with a corresponding one of the lead wires 51 on the lower side of a corresponding one of the base through holes 213. The lead wires 51 are arranged to extend along the lower surface of the base plate 21 toward the circuit board 24, and are connected to the respective electrodes 241. Thus, on the lower side of the base plate 21, each lead wire 51 is drawn tight in a straining direction, i.e., a direction perpendicular or substantially perpendicular to the central axis J1 and pointing from a corresponding one of the base through holes 213 to a corresponding one of the electrodes 241. A region on the lower surface of the base plate 21 which extends between the electrodes 241 and the base through holes 213 is preferably covered with the circuit board 24 and the lead wire guide member 23. Moreover, the lead wire guide member 23 is arranged to cover at least a portion of each base through hole 213.

Figure 6:
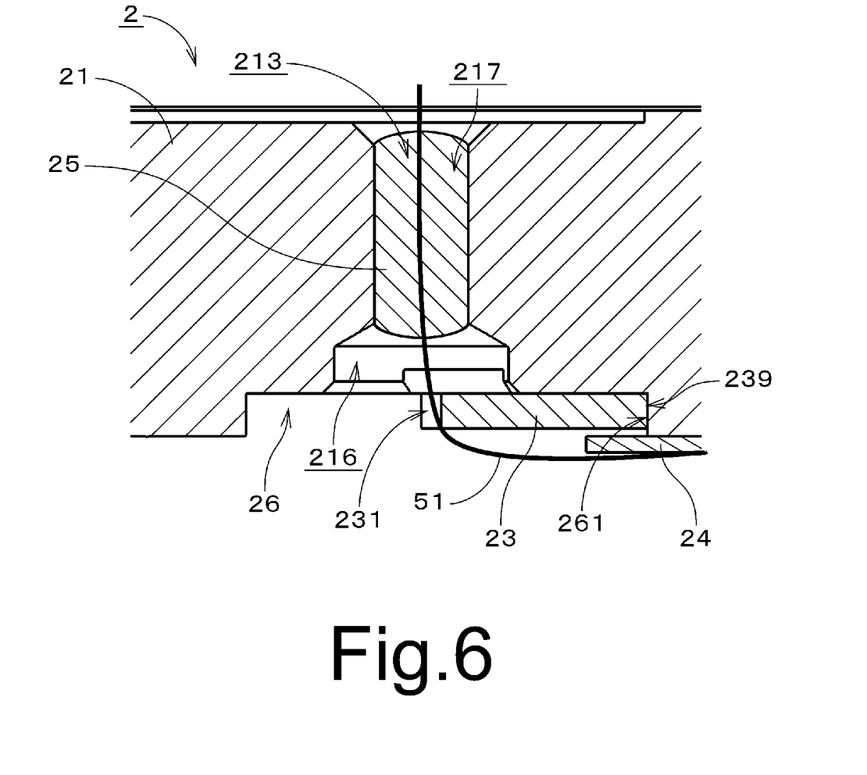
FIG. 6 is a vertical cross-sectional view of the stationary portion according to the first preferred embodiment of the present invention.

FIG. 6 is a cross-sectional view of the stationary portion 2, illustrating a section of the stationary portion 2 taken along a plane including a central axis of one of the base through holes 213 and parallel to the straining direction. As described above, each of the lead wires 51 is drawn tight in the straining direction. Accordingly, a force is applied to the lead wire guide member 23 by each of the lead wires 51 in the straining direction. An outer edge 239 of the lead wire guide member 23, which at least faces radially outward, is arranged to be in contact with a portion of an inner wall surface 261 of the comprehensive recessed portion 26 which faces toward the central axis J1. Movement of the lead wire guide member 23 in any direction perpendicular or substantially perpendicular to the central axis J1 is thus restricted. In this situation, the cut portions 231 are preferably arranged directly under the respective base through holes 213. As a result, each lead wire 51 is prevented from contacting a side surface or a lower edge of a corresponding one of the base through holes 213. Hereinafter, the inner wall surface 261 of the comprehensive recessed portion 26 which faces toward the central axis J1 will be referred to as a "contact wall surface" 261. The contact wall surface 261 is an edge which extends in the axial direction and faces radially inward in the lower surface of the base plate 21, and serves as a movement restricting portion arranged to restrict the movement of the lead wire guide member 23 as described above. On the upper side of the base plate 21, an insulating bushing or an insulation sheet is provided as necessary to prevent each lead wire 51 from making contact with an upper edge of the corresponding base through hole 213. The comprehensive recessed portion 26 is arranged to have a depth greater than the thickness of the lead wire guide member 23. The circuit board 24, which partially overlaps with the lead wire guide member 23, is thus prevented from being warped.

Referring to FIG. 4, the comprehensive recessed portion 26 preferably includes a plurality of expanded portions 262 each of which is recessed toward the central axis J1. Each expanded portion 262 is located between two adjacent ones of the base through holes 213 arranged in the circumferential direction. Referring to FIG. 3, the lead wire guide member 23 includes a plurality of raised portions 233 each of which is arranged to project toward the central axis J1. Each raised portion 233 is fitted to a separate one of the expanded portions 262. A side surface of each raised portion 233 preferably includes a portion that has the same or substantially the same shape and size as those of an inner wall surface of a corresponding one of the expanded portions 262. In the case of the stationary portion 2 illustrated in FIG. 3, the lead wire guide member 23 is preferably, for example, press fitted between the contact wall surface 261 and the inner wall surface of each expanded portion 262. Note, however, that a gap may be present between each raised portion 233 and the inner wall surface of the corresponding expanded portion 262. Even in that case, the movement of the lead wire guide member 23 in any direction perpendicular or substantially perpendicular to the central axis J1 is restricted because the lead wire guide member 23 contacts the contact wall surface 261 as a result of the force being applied to the lead wire guide member 23 by each lead wire 51 in the straining direction. In the case of the base plate 21 illustrated in FIG. 3, the base through holes 213 and the expanded portions 262 are preferably defined by machine working.

Referring to FIGS. 4 and 6, the base plate 21 preferably further includes expanded opening portions 216 each of which is a lower end portion of a separate one of the base through holes 213. The cross-sectional area of each base through hole 213 perpendicular or substantially perpendicular to the central axis J1 is arranged to be greater in the expanded opening portion 216 than in a portion of the base through hole 213 above the expanded opening portion 216. In other words, each base through hole 213 includes a small diameter portion 217 (see FIG. 6) having a first inside diameter, and the expanded opening portion 216 having a second inside diameter greater than the first inside diameter. The expanded opening portion 216 is located axially below the small diameter portion 217. Referring to FIG. 3, the expanded opening portion 216 is arranged to extend up to a position not covered by the lead wire guide member 23.

A sealant 25 is arranged between an entire circumferential extent of the small diameter portion 217 of each base through hole 213 and an entire circumferential extent of the lead wire 51 which passes through the base through hole 213. The sealant 25 is preferably, for example, an adhesive. In FIG. 3, the sealant 25 is indicated by parallel oblique lines. When viewed along the axial direction, a portion of each base through hole 213, or about a half of each base through hole 213 in the case of FIG. 3, is preferably exposed without being covered by any member. This makes it easy to inject the sealant into the base through hole 213. Each expanded opening portion 216 functions also as a buffer when the sealant is injected into the base through hole 213.

The lower surface of the base plate 21 preferably further includes a plurality of auxiliary recessed portions 215. Each of the auxiliary recessed portions 215 is joined to a separate one of the base through holes 213. Each auxiliary recessed portion 215 is arranged to have a depth greater than that of the comprehensive recessed portion 26 and smaller than that of the expanded opening portion 216. The auxiliary recessed portions 215 are preferably four in number, for example, and are arranged in the circumferential direction. It is assumed here that two of the four auxiliary recessed portions 215 which are not at either circumferential end are referred to as "inner auxiliary recessed portions" 215. Each of the two inner auxiliary recessed portions 215 is arranged to extend radially outward beyond the contact wall surface 261 (see FIG. 4). An end portion of each of the two inner auxiliary recessed portions 215, the end portion being away from the corresponding base through hole 213, is open outwardly through open portions 232 and 242 defined in the lead wire guide member 23 and the circuit board 24, respectively. The open portions 232 and 242 are portions of the lead wire guide member 23 and the circuit board 24, respectively, which are locally removed at outer edges thereof. Each of the auxiliary recessed portions 215 at both circumferential ends is arranged to extend up to a vicinity of the contact wall surface 261. A portion of an end portion of each of the auxiliary recessed portions 215 at both circumferential ends is preferably not covered by either the lead wire guide member 23 or the circuit board 24. Thus, when viewed along the axial direction, each auxiliary recessed portion 215 is arranged to extend from a position covered by the lead wire guide member 23 at the corresponding base through hole 213 up to a position radially outside the lead wire guide member 23. Therefore, each auxiliary recessed portion 215 functions as a path of air escape when the sealant is filled into the corresponding base through hole 213.

As described above, on the lower surface of the base plate 21, the movement of the lead wire guide member 23, to which the force is applied by each of the lead wires 51 in the straining direction, is restricted by the contact wall surface 261. As a result, each of the cut portions 231 of the lead wire guide member 23, which contact the corresponding lead wire 51, is positioned precisely with respect to the corresponding base through hole 213. This ensures insulation between the base plate 21 and each lead wire 51. In addition, the sealant 25 is preferably provided between the entire circumferential extent of each base through hole 213 and the entire circumferential extent of the lead wire 51 which passes through the base through hole 213. This improves airtightness of the disk drive apparatus 1.

Moreover, the auxiliary recessed portions 215, which are joined to the respective base through holes 213, are defined in the lower surface of the base plate 21. Each auxiliary recessed portion 215 is open outwardly on a radially outer side of the lead wire guide member 23. When the sealant is filled into each base through hole 213, air in the base through hole 213 is discharged to an outside through a corresponding one of the auxiliary recessed portions 215. Provision of the auxiliary recessed portion 215 used as air escape enables the sealant to be filled into the base through hole 213. Provision of the expanded opening portion 216 makes it easy to fill the sealant into the base through hole 213.

The region on the lower surface of the base plate 21 which extends between the electrodes 241 and the base through holes 213 is preferably covered with the circuit board 24 and the lead wire guide member 23. This contributes to more effectively ensuring insulation between each lead wire 51 and the base plate 21.

Figure 7:
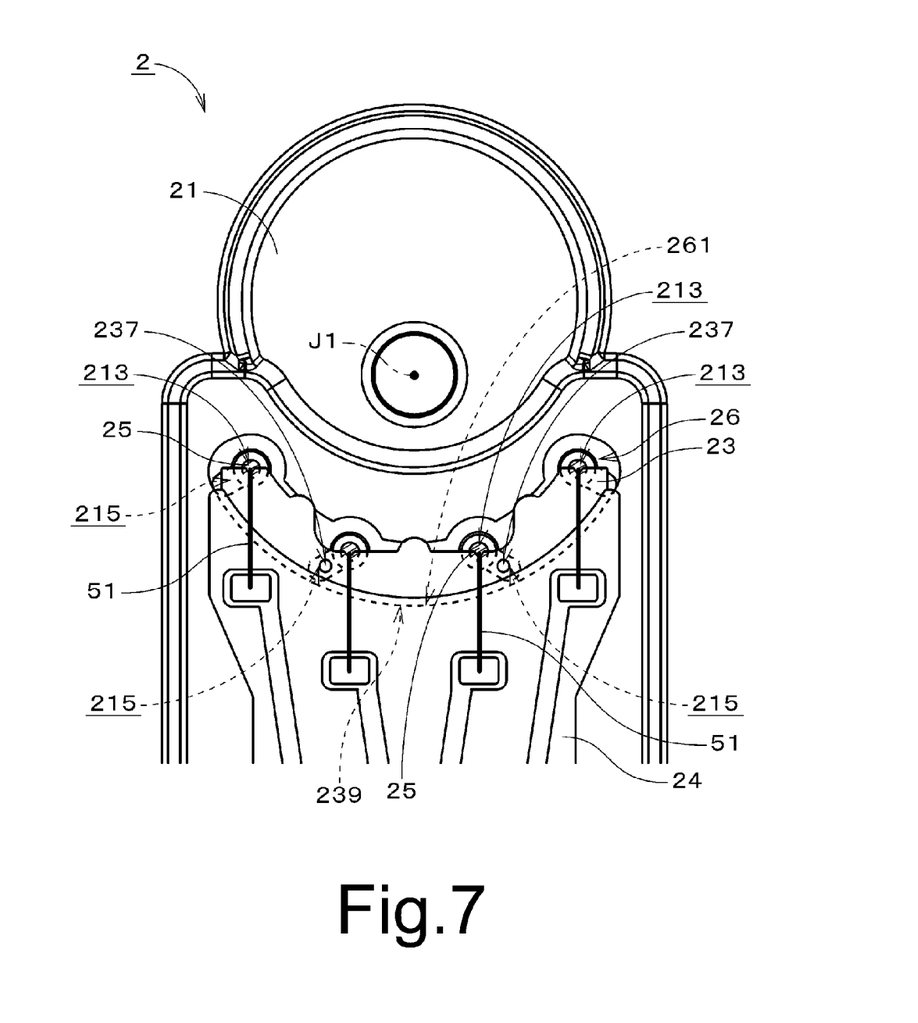
FIG. 7 is a diagram illustrating a stationary portion according to an example modification of the first preferred embodiment of the present invention.

FIG. 7 is a diagram illustrating a stationary portion 2 according to an example modification of the above-described first preferred embodiment. The open portions 232 and 242 of the lead wire guide member 23 and the circuit board 24, respectively, illustrated in FIG. 3 are omitted in the stationary portion 2 illustrated in FIG. 7. In addition, the lead wire guide member 23 includes two opening portions 237 each of which is open under a separate one of the two inner auxiliary recessed portions 215. The stationary portion 2 according to the present example modification is otherwise similar in structure to the stationary portion 2 illustrated in FIG. 3. Accordingly, like members or portions are designated by like reference numerals.

The two inner auxiliary recessed portions 215 are open outwardly through the respective opening portions 237. Air existing in each base through hole 213 is preferably discharged to the outside through a corresponding one of the auxiliary recessed portions 215 when the sealant is filled into the base through hole 213. Provision of the auxiliary recessed portion 215 used as air escape enables the sealant to be filled into the base through hole 213.

Second Preferred Embodiment

Figure 8:
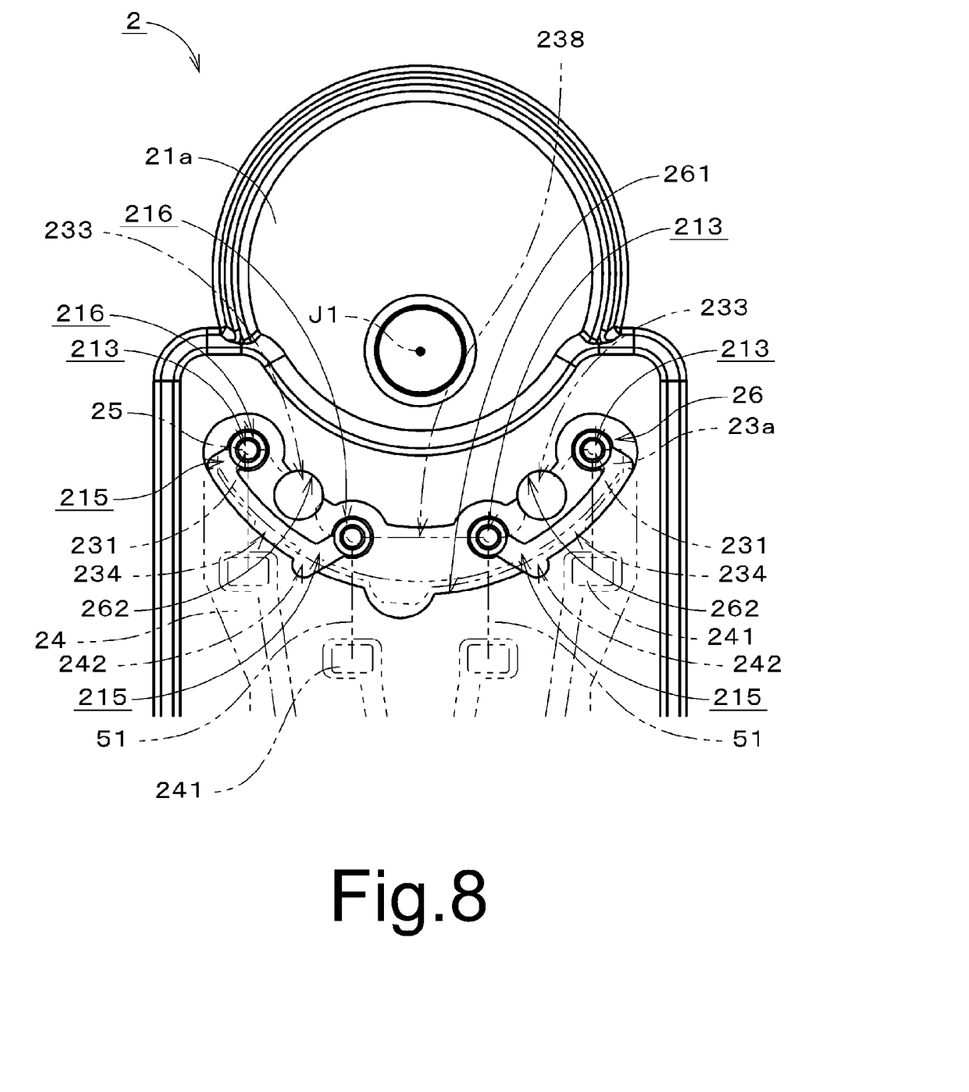
FIG. 8 is a bottom view of a base plate according to a second preferred embodiment of the present invention.
Figure 9:
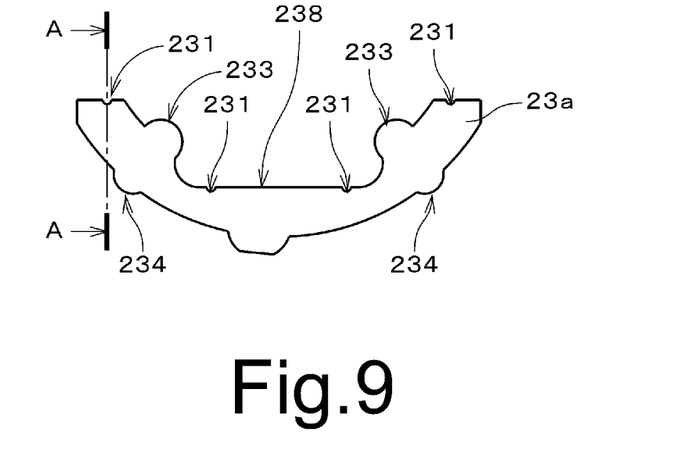
FIG. 9 is a bottom view of a lead wire guide member according to the second preferred embodiment of the present invention.

FIG. 8 is a bottom view of a base plate 21a according to an exemplary second preferred embodiment of the present invention. FIG. 9 is a bottom view of a lead wire guide member 23a according to the second preferred embodiment. A stationary portion 2 according to the second preferred embodiment is preferably different from the stationary portion 2 illustrated in FIG. 3 in the shape of a portion of the base plate 21a and the shape of the lead wire guide member 23a. The stationary portion 2 according to the second preferred embodiment is preferably otherwise similar in structure to the stationary portion 2 illustrated in FIG. 3, and accordingly, like members or portions are designated by like reference numerals. In FIG. 8, each of the lead wire guide member 23a, a circuit board 24, and lead wires 51 is represented by a chain double-dashed line.

The base plate 21a preferably includes a comprehensive recessed portion 26 and base through holes 213 which are substantially the same as those of the base plate 21 illustrated in FIG. 3. The lead wire guide member 23a includes a plurality of raised portions 233 each of which is arranged to project toward a central axis J1, and a plurality of raised portions 234 each of which is arranged to project toward the circuit board 24. Hereinafter, each raised portion 233 will be referred to as an "inner raised portion" 233, while each raised portion 234 will be referred to as an "outer raised portion" 234. A force is applied to the lead wire guide member 23a by each of the lead wires 51 in a straining direction. A side surface of each of the outer raised portions 234 is a portion of an outer edge of the lead wire guide member 23a, and is arranged to contact a contact wall surface 261 of the comprehensive recessed portion 26, the contact wall surface 261 facing toward the central axis J1. Movement of the lead wire guide member 23a in any direction perpendicular or substantially perpendicular to the central axis J1 is thus restricted. This enables each of a plurality of cut portions 231 of an inner edge 238 of the lead wire guide member 23a to be arranged directly under a corresponding one of the base through holes 213, and prevents each of the lead wires 51 from contacting a side surface or a lower edge of a corresponding one of the base through holes 213.

An inner wall surface of the comprehensive recessed portion 26 preferably includes a plurality of expanded portions 262 each of which is recessed toward the central axis J1. Each inner raised portion 233 is fitted to a separate one of the expanded portions 262. A side surface of each inner raised portion 233 preferably includes a portion that has the same or substantially the same shape and size as those of an inner wall surface of a corresponding one of the expanded portions 262. In the case of the stationary portion 2, the lead wire guide member 23a is preferably, for example, press fitted between the contact wall surface 261 and the inner wall surface of each expanded portion 262. Note, however, that a gap may be present between each inner raised portion 233 and the inner wall surface of the corresponding expanded portion 262. Even in that case, the movement of the lead wire guide member 23a in any direction perpendicular or substantially perpendicular to the central axis J1 is restricted because the lead wire guide member 23a contacts the contact wall surface 261 as a result of the force being applied to the lead wire guide member 23a by each lead wire 51 in the straining direction. In the case of the base plate 21a illustrated in FIG. 8, each expanded portion 262 is preferably defined by providing a hole portion including a bottom in the comprehensive recessed portion 26 by machine working.

A plurality of auxiliary recessed portions 215 are defined in a lower surface of the base plate 21a. Each of the auxiliary recessed portions 215 is joined to a separate one of the base through holes 213. The auxiliary recessed portions 215 are preferably four in number, for example, and are arranged in the circumferential direction. The four auxiliary recessed portions 215 include auxiliary recessed portions 215 at both circumferential ends and two inner auxiliary recessed portions 215. Each of the two inner auxiliary recessed portions 215 is arranged to extend outwardly beyond an inner wall surface of the comprehensive recessed portion 26 on a side closer to the circuit board 24, i.e., the contact wall surface 261. An end portion of each inner auxiliary recessed portion 215 is open outwardly through an open portion 242 defined in the circuit board 24. Each of the auxiliary recessed portions 215 at both circumferential ends is arranged to extend along the contact wall surface 261 of the comprehensive recessed portion 26 to be joined to a corresponding one of the inner auxiliary recessed portions 215. As described above, of the plurality of auxiliary recessed portions 215, each inner auxiliary recessed portion 215 and one of the outer auxiliary recessed portions 215 are preferably arranged to be continuous with each other. In other words, auxiliary recessed portions 215 each of which is joined to two of the base through holes 213 are provided. Depending on design of a motor 12, an auxiliary recessed portion 215 joined to three or more base through holes 213 may be provided.

Figure 10:
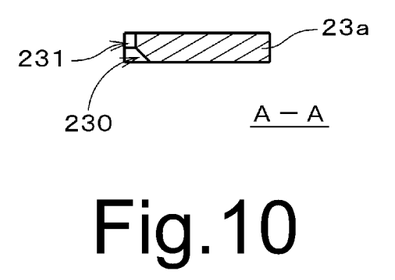
FIG. 10 is a vertical cross-sectional view of the lead wire guide member according to the second preferred embodiment of the present invention.

FIG. 10 is a cross-sectional view of the lead wire guide member 23a taken along line A-A in FIG. 9. The cut portion 231 preferably includes a portion 230 arranged to extend in the straining direction with decreasing height in FIG. 10, that is, with decreasing distance from a top of the motor 12. The width of the portion 230 measured in a direction perpendicular to the straining direction is arranged to gradually increase with decreasing distance from the top of the motor 12. Therefore, when the lead wire 51 passing through the base through hole 213 to reach a lower side of the base plate 21a is arranged in the cut portion 231, the lead wire 51 is guided by an inclined surface of the portion 230 of the cut portion 231. An end portion of the lead wire 51 is connected to an electrode 241 on the circuit board 24.

As described above, in the stationary portion 2, the movement of the lead wire guide member 23a, to which a force is applied by each of the lead wires 51 in the straining direction, is preferably restricted by the contact wall surface 261. As a result, each of the cut portions 231 of the lead wire guide member 23a, which contacts the corresponding lead wire 51, is preferably positioned precisely with respect to the corresponding base through hole 213. In addition, a sealant 25 is present between an entire circumferential extent of each base through hole 213 and an entire circumferential extent of the lead wire 51 which passes through the base through hole 213. This improves airtightness of the disk drive apparatus 1.

Here, in the case where the base plate 21a is molded by a casting process, a corner at which the inner wall surface and a bottom surface of the comprehensive recessed portion 26 meet may be rounded. In the case of the base plate 21a illustrated in FIG. 8, however, a portion of each auxiliary recessed portion 215, which has a depth greater than that of the comprehensive recessed portion 26, is defined along the contact wall surface 261, which serves as a movement restricting portion. That is, each auxiliary recessed portion 215 includes a portion extending along a portion of the contact wall surface 261 in the comprehensive recessed portion 26. This enables the side surface of each outer raised portion 234 of the lead wire guide member 23a to contact the contact wall surface 261 throughout an entire axial extent thereof. Thus, the auxiliary recessed portions 215 is preferably used to precisely define the movement restricting portion. This in turn enables the lead wire guide member 23a to be more precisely positioned with respect to each base through hole 213.

Provision of the auxiliary recessed portions 215 used to provide air escape enables the sealant to be filled into each base through hole 213. Two or more of the plurality of auxiliary recessed portions 215 being continuous with each other contributes to more securely accomplishing the air escape at the time of the filling of the sealant. Moreover, provision of expanded opening portions 216 makes it easy to fill the sealant 25 into each base through hole 213.

Note that the disk drive apparatus 1 described above may be modified in a variety of manners. For example, a plurality of independent plate-shaped insulating members each of which includes the cut portion 231 may be arranged in the comprehensive recessed portion 26, if so desired. In this case, movement of each insulating member in any direction perpendicular or substantially perpendicular to the central axis J1 is restricted because the insulating member contacts the contact wall surface 261 as a result of a force being applied to the insulating member by the lead wire 51 in the straining direction. This enables each insulating member to be precisely positioned with respect to a corresponding one of the base through holes 213, and prevents each lead wire 51 contacting the lower edge of a corresponding one of the base through holes 213. In this case, a collection of the plurality of insulating members is regarded as the lead wire guide member. In the case where a plurality of insulating members are used, movement restricting portions may be provided separately for the insulating members in the lower surface of the base plate 21. Provision of the lead wire guide member 23, that is, a single electrically insulating member including the plurality of cut portions 231, is preferable from the viewpoint of decreasing the number of parts of the motor 12.

The contact wall surface 261 of the comprehensive recessed portion 26 may be used as the movement restricting portion together with another portion provided in the lower surface of the base plate 21. That is, it may be so arranged that a portion of the contact wall surface 261 is at least a portion of the movement restricting portion.

In the case where each base through hole 213 has a relatively large size, for example, the cut portions 231 may be omitted in the inner edge 238 of the lead wire guide member 23 if so desired. Because, even in this case, each of the lead wires 51 is drawn tight in the straining direction while being in contact with the inner edge 238, each lead wire 51 is positioned with respect to a corresponding one of the base through holes 213.

Features of the above-described preferred embodiments and the modifications thereof may be combined appropriately as long as no conflict arises.

Preferred embodiments of the present invention and modifications thereof preferably are applicable to spindle motors for use in disk drive apparatuses, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor for use in a disk drive apparatus, the spindle motor comprising:
    a rotating portion including a rotor magnet, and configured to rotate about a central axis extending in a vertical direction;
    a stationary portion; and
    a bearing mechanism configured to support the rotating portion such that the rotating portion is rotatable with respect to the stationary portion; wherein
    the stationary portion includes:
        a base portion in a shape of a plate, extending in directions perpendicular or substantially perpendicular to an axial direction, and including a plurality of base through holes passing therethrough in the axial direction;
        a stator including a stator core located on an upper side of the base portion, and a plurality of coils arranged on the stator core;
        a plurality of lead wires extending from the plurality of coils;
        a circuit board located on a lower surface of the base portion;
        a plate-shaped lead wire guide member made of an electrically insulating material, and extending along the lower surface of the base portion; and
        a movement restricting portion located in the lower surface of the base portion, and defined by an edge extending in the axial direction and facing radially inward;
    the plurality of lead wires pass through the plurality of base through holes to reach the lower surface of the base portion, and extend along the lower surface of the base portion to be connected to the circuit board;
    the stationary portion includes a sealant located between an entire circumferential extent of each base through hole and an entire circumferential extent of the lead wire passing through the base through hole;
    the lead wire guide member includes:
        an inner edge opposite to the plurality of lead wires; and
        an outer edge that at least faces radially outward; and
    the movement restricting portion contacts the outer edge of the lead wire guide member.

2. The spindle motor for use in the disk drive apparatus according to claim 1, wherein
    each of the plurality of base through holes includes:
        a small diameter portion having a first inside diameter; and
        an expanded opening portion having a second inside diameter greater than the first inside diameter; and
    the expanded opening portion is located axially below the small diameter portion.

3. The spindle motor for use in the disk drive apparatus according to claim 1, wherein
    the lower surface of the base portion includes an auxiliary recessed portion or portions joined to each of the base through holes;
    the lead wire guide member covers at least a portion of each of the plurality of base through holes; and
    each of the auxiliary recessed portion or portions extends up to a position radially outside the lead wire guide member.

4. The spindle motor for use in the disk drive apparatus according to claim 3, wherein at least one of the auxiliary recessed portion or portions is joined to two or more of the plurality of base through holes.

5. The spindle motor for use in the disk drive apparatus according to claim 3, wherein
    the lower surface of the base portion includes a comprehensive recessed portion including the plurality of base through holes when viewed along the axial direction;
    an opening of each of the plurality of base through holes is located in the comprehensive recessed portion;
    a portion of an inner wall surface of the comprehensive recessed portion includes at least a portion of the movement restricting portion; and
    one of the auxiliary recessed portion or portions includes a portion extending along the portion of the inner wall surface in the comprehensive recessed portion.

6. The spindle motor for use in the disk drive apparatus according to claim 5, wherein the comprehensive recessed portion has a depth greater than a thickness of the lead wire guide member.

7. The spindle motor for use in the disk drive apparatus according to claim 1, wherein
    the lower surface of the base portion includes an auxiliary recessed portion or portions joined to each of the plurality of base through holes;
    the lead wire guide member covers at least a portion of each of the plurality of base through holes; and
    the lead wire guide member includes an opening portion that is open under one of the auxiliary recessed portion or portions.

8. The spindle motor for use in the disk drive apparatus according to claim 7, wherein at least one of the auxiliary recessed portion or portions is joined to two or more of the plurality of base through holes.

9. The spindle motor for use in the disk drive apparatus according to claim 1, wherein
    the lower surface of the base portion includes a comprehensive recessed portion including the plurality of base through holes when viewed along the axial direction; and
    a portion of an inner wall surface of the comprehensive recessed portion is at least a portion of the movement restricting portion.

10. The spindle motor of the disk drive apparatus according to claim 9, wherein the comprehensive recessed portion has a depth greater than a thickness of the lead wire guide member.

11. The spindle motor for use in the disk drive apparatus according to claim 1, wherein
    the circuit board includes a plurality of electrodes connected to the plurality of lead wires; and a region on the lower surface, the region extending between the plurality of electrodes and the plurality of base through holes, is covered with the circuit board and the lead wire guide member.

12. The spindle motor for use in the disk drive apparatus according to claim 1, wherein
the inner edge of the lead wire guide member includes a plurality of cut portions each of which is arranged in contact with a separate one of the plurality of lead wires; and
each of the plurality of cut portions includes a portion with a width that gradually increases with decreasing distance from an axially uppermost portion of the spindle motor.

13. A disk drive apparatus comprising:
the spindle motor according to claim 1, the spindle motor being configured to rotate a disk;
an access portion configured to perform at least one of reading and writing of information from or to the disk; and
a housing configured to contain the disk, the spindle motor, and the access portion.

14. A spindle motor for use in a disk drive apparatus, the spindle motor comprising:
a rotating portion including a rotor magnet, and configured to rotate about a central axis extending in a vertical direction;
a stationary portion; and
a bearing mechanism configured to support the rotating portion such that the rotating portion is rotatable with respect to the stationary portion; wherein
the stationary portion includes:
a base portion in a shape of a plate, extending in directions perpendicular or substantially perpendicular to an axial direction, and including a plurality of base through holes passing therethrough in the axial direction;
a stator including a stator core located on an upper side of the base portion, and a plurality of coils located on the stator core;
a plurality of lead wires extending from the plurality of coils;
a circuit board located on a lower surface of the base portion; and
a plate-shaped lead wire guide member made of an electrically insulating material, and extending along the lower surface of the base portion;
the plurality of lead wires pass through the plurality of base through holes and reach the lower surface of the base portion, and extend along the lower surface of the base portion to be connected to the circuit board;
the stationary portion further includes a sealant located between an entire circumferential extent of each base through hole and an entire circumferential extent of the lead wire arranged to pass through the base through hole;
the lower surface of the base portion includes an auxiliary recessed portion or portions joined to each of the plurality of base through holes;
the lead wire guide member covers at least a portion of each of the plurality of base through holes; and
each of the auxiliary recessed portion or portions extends up to a position radially outside the lead wire guide member.

15. A spindle motor for use in a disk drive apparatus, the spindle motor comprising:
a rotating portion including a rotor magnet, and configured to rotate about a central axis extending in a vertical direction;
a stationary portion; and
a bearing mechanism supporting the rotating portion such that the rotating portion is rotatable with respect to the stationary portion; wherein
the stationary portion includes:
a base portion in a shape of a plate, extending in directions perpendicular or substantially perpendicular to an axial direction, and including a plurality of base through holes passing therethrough in the axial direction;
a stator including a stator core located on an upper side of the base portion, and a plurality of coils located on the stator core;
a plurality of lead wires extending from the plurality of coils;
a circuit board located on a lower surface of the base portion; and
a plate-shaped lead wire guide member made of an electrically insulating material, and extending along the lower surface of the base portion; wherein
the plurality of lead wires pass through the plurality of base through holes and reach the lower surface of the base portion, and extend along the lower surface of the base portion to be connected to the circuit board;
the stationary portion further includes a sealant located between an entire circumferential extent of each of the plurality of base through holes and an entire circumferential extent of the plurality of lead wires that pass through the plurality of base through holes;
the lower surface of the base portion includes an auxiliary recessed portion or portions joined to each of the plurality of base through holes;
the lead wire guide member covers at least a portion of each of the plurality of base through holes; and
the lead wire guide member includes an opening portion that is open under one of the auxiliary recessed portion or portions.

* * * * *